(12) United States Patent
Elent et al.

(10) Patent No.: US 6,467,606 B1
(45) Date of Patent: Oct. 22, 2002

(54) CONVEYOR SYSTEM WITH DIVERTER

(75) Inventors: Michael Elent, Thornhill; Ronald W Martin, Guelph; Constantin Mighiu, North York, all of (CA)

(73) Assignee: Langen Packaging, Inc., Ontario (CA)

( * ) Notice: Subject to any disclaimer, the term of this patent is extended or adjusted under 35 U.S.C. 154(b) by 0 days.

(21) Appl. No.: 09/637,019

(22) Filed: Aug. 14, 2000

(51) Int. Cl.$^7$ ............................................. B65G 47/10
(52) U.S. Cl. .................. 198/370.1; 198/441; 198/475.1
(58) Field of Search .............................. 198/370.1, 441, 198/474.1, 475.1, 435

(56) References Cited

U.S. PATENT DOCUMENTS

| | | | | |
|---|---|---|---|---|
| 2,861,672 A | * | 11/1958 | Buhrer et al. ............ | 198/475.1 |
| 3,135,373 A | * | 6/1964 | Scarf ........................ | 198/475.1 |
| 3,776,343 A | * | 12/1973 | Gouy ........................ | 198/475.1 |
| 3,795,302 A | * | 3/1974 | Schoppee ................. | 198/475.1 |
| 4,214,848 A | * | 7/1980 | Verwey et al. ........... | 198/475.1 |
| 5,101,956 A | * | 4/1992 | Gambetti .................. | 198/475.1 |
| 5,715,930 A | * | 2/1998 | Hogenkamp ............. | 198/435 |

* cited by examiner

Primary Examiner—Joseph E. Valenza
(74) Attorney, Agent, or Firm—Antonelli, Terry, Stout & Kraus, LLP

(57) ABSTRACT

A rotary diverter can be operated at high speed to divert selected products from one conveyor to a vertically displaced second conveyor. The rotary diverter can have at least one rotary member with a plurality of radial arms. Each radial arm can have an end effector with a lifting platform. A timing belt may be coupled to each end effector to the rotary member in order to keep the lifting platform substantially horizontal. A control system is provided to control a drive mechanism for rotating the rotary member. As the rotary member rotates, the lifting platform of the end effector rises through the first conveyor to lift a selected product over the second conveyor. As the rotary member continues to rotate the lifting platform can then descend through the second conveyor to deliver the selected product upon the second conveyor. During operation, the control system can ensure that the lifting platform of the end effectors: (i) substantially matches the horizontal velocity of the first conveyor when they lift a selected product from the first conveyor; and (ii) substantially matches the horizontal velocity of the second conveyor when they deliver a selected product upon the second conveyor. This arrangement diminishes the amount of acceleration, deceleration and knocking that the selected products are subjected to during the diverting process, which reduces the risk of product misalignment.

29 Claims, 12 Drawing Sheets

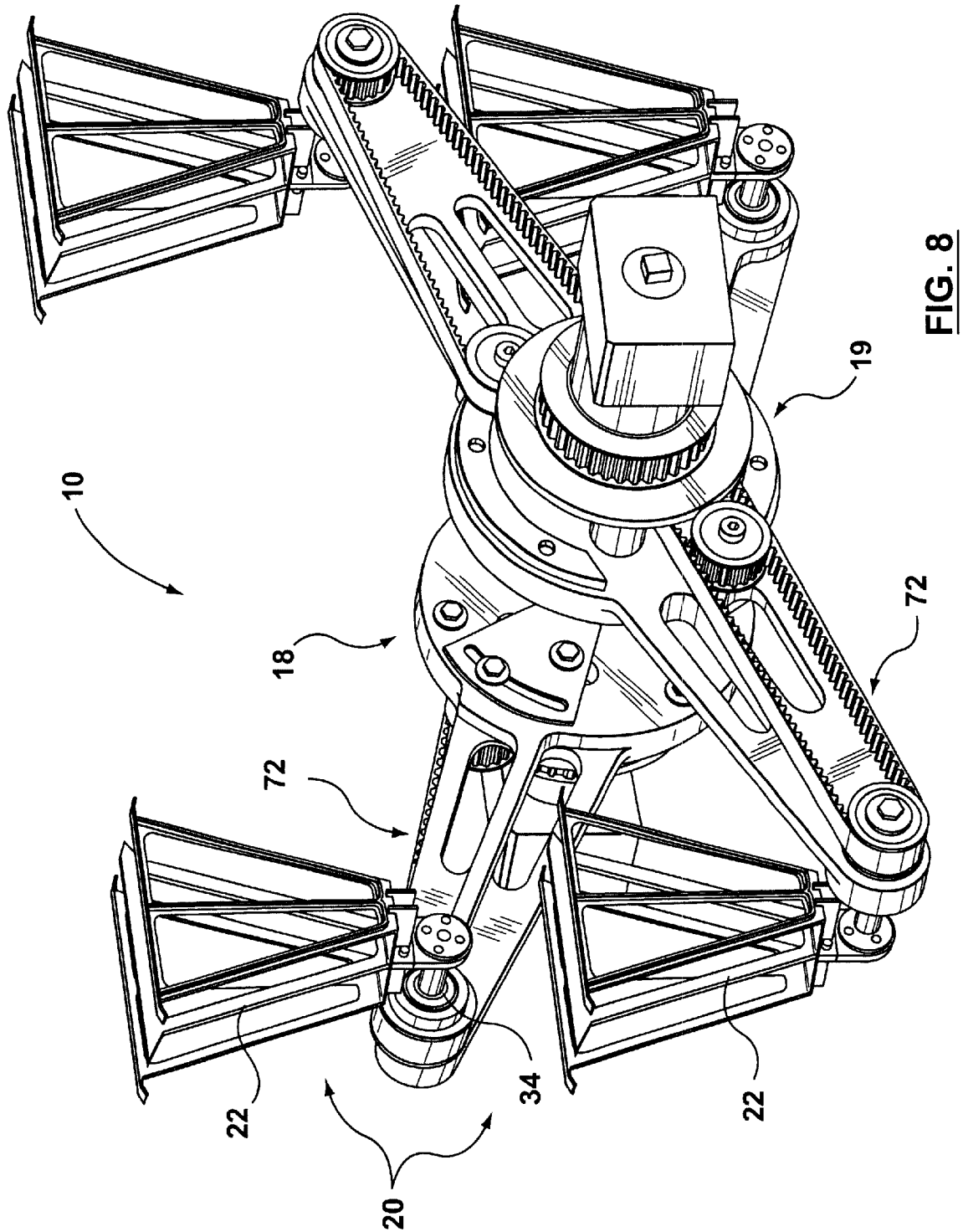

CONVEYOR SYSTEM WITH DIVERTER

FIELD OF THE INVENTION

The present invention relates to conveyor systems, including conveyor systems that divert items/products from one conveyor to another conveyor.

BACKGROUND OF THE INVENTION

The use of conveyors is well known in many industries. In manufacturing, conveyors are commonly used, for example, to move partially assembled products or parts between workstations. In product packaging environments, conveyors commonly move finished products and packages through packaging stations.

Whatever the application, it is sometimes necessary to selectively divert items/products from one conveyor to another conveyor. For example, when a downstream packaging station is incapable of handling the volume of products arriving from an upstream conveyor, it may be necessary to employ two or more downstream conveyors and packaging machines to avoid a bottleneck in the process. In such cases, some of the products must be diverted from the upstream conveyor to the additional downstream conveyor (s) in order to apportion product between them. In another example, pre-arranged lightweight products, such as a stack of tissue paper or fabric softener sheets, may become misaligned if they are knocked or subjected to rapid acceleration or deceleration during the packaging process. In these cases, product misalignment may be diminished by reducing the speed at which the product is moved during the packaging process. This may be achieved by diverting some upstream products to one or more downstream conveyors to reduce the load of product that each packaging station must handle.

A problem with known diverters is that they too often knock or subject the diverted products to rapid acceleration or deceleration during the diverting process. This may have a number of undesirable effects. For example, in a manufacturing environment, diversion of sensitive or delicate products by a conventional diverter may dislodge components or otherwise damage the products. In a packaging environment, pre-arranged lightweight products may easily become misaligned during the diverting process by these conventional diverters and thereby compromise the proper operation of packaging machines.

Known diverters utilise apparatus which selectively divert items or products in a generally horizontal plane. Items are taken out of the incoming conveyor stream and moved sideways or at an angle, but in a generally horizontal plane. These types of diverters are not particularly good at providing a low level of acceleration or deceleration during the diversion process.

Accordingly, there is a need for diverters that can diminish the amount of acceleration, deceleration and knocking that products are subjected to during the diverting process.

Another problem with some conveyor systems exists at the end of a conveyor where product has to be transferred from the conveyor into a bucket that will take the product to a further station. If the product is flexible about its transverse axes, then if there is any misalignment or any force applied to the front of the product, such as from movement through air as the product leaves the conveyor for the bucket, then the product can fold about a transverse axis, possibly resulting in mis-feed into the bucket. Accordingly, it is desirable to provide a bucket in-feed station that reduces the risk of mis-feeding.

SUMMARY OF THE INVENTION

It is desirable to provide a conveyor system that has a diverter for selectively diverting products from one conveyor to another conveyor. It is also desirable to provide a conveyor system that can easily transfer flexible products into a bucket. The diverter will be particularly useful in high-speed conveyor systems.

Advantageously, the present invention may diminish product acceleration, deceleration and knocking during the diverting process so as to reduce product misalignment; may reduce the volume of product on the conveyors after selected products are diverted; and may reduce the incidence of product misfeeds.

In accordance with an aspect of the present invention there is provided an apparatus for transferring a selected product of a plurality of products carried on a first conveyor, from a pickup position on said first conveyor to a delivery position on a second conveyor, said second conveyor being vertically displaced relative to said first conveyor, said apparatus comprising: (a) a member having a transfer effector, said member mounted to a frame for movement to move said transfer effector between said pick-up position and said delivery position; (b) a drive mechanism for moving said member; and (c) a control system operable to control the speed and position of said transfer effector; said transfer effector being adapted for retrieving said selected product at said pick-up position and depositing said selected article at said delivery position, wherein said control system controls the speed and position of said transfer effector from retrieval of said selected product at said pickup position to delivery of said selected product at said delivery position.

In accordance with another aspect of the present invention there is provided an apparatus for transferring a selected product from a pick-up position on a first conveyor to a delivery position on a vertically displaced second conveyor, comprising: (a) a plurality of rotary members rotatable in a substantially vertical plane of rotation about a sun axis; (b) a plurality of radial arms extending outward from each of said rotary members, said radial arms spaced equally apart along said plane of rotation; (c) a drive mechanism for rotating each of said rotary members about said sun axis; (d) a lifting effector extending from each of said radial arms; and (e) a control system for controlling the speed and position of each said lifting effector by controlling the rotation of said rotary members; wherein said control system controls the rotation of each of said rotary members so that said lifting effector obtains said selected product at said pickup position and delivers said selected product to said delivery position.

In accordance with another aspect of the present invention there is provided a system for diverting selected product from non-selected product comprising: (a) a first conveyor; (b) a second conveyor vertically displaced from said first conveyor; (c) a rotary diverter for acquiring said selected product from said first conveyor at substantially the same horizontal velocity as said first conveyor, and for delivering said selected product onto said second conveyor at substantially the same horizontal velocity as said second conveyor; and (d) a pair of in-feed conveyor stations, one of said in-feed conveyor stations positioned at the terminal end of said first conveyor for receiving said non-selected product, and the other one of said in-feed conveyor stations positioned at the terminal end of said second conveyor for receiving said selected product.

In accordance with another aspect of the present invention there is provided a conveyor system comprising: (a) a diverter station having a diverter; (b) a first conveyor diverter portion, said first conveyor being configured to deliver items in succession, to and through said diverter station; (c) a second conveyor having a receiving portion vertically displaced in relation to said first conveyor, said second conveyor operable to move selected items transferred from said first conveyor to said receiving portion of said second conveyor by said diverter, away from said diverter station; said diverter, having a pick-up member, said diverter operable to move said pick-up member to pick up selected items positioned at said diverter portion from said first conveyor in succession and move said selected items from said first conveyor to said receiving portion and release said selected items in succession at said receiving portion of said second conveyor; whereby at least some of said items arriving at said diverter station on said first conveyor are diverted by said diverter onto said second conveyor.

In accordance with another aspect of the invention there is provide a conveyor system comprising: (a) a diverter station having a diverter; (b) a first conveyor diverter portion, said first conveyor being configured to deliver items in succession, to and through said diverter station, said first conveyor having a receiving portion; (c) a second conveyor that is vertically displaced in relation to said first conveyor, said second conveyor operable to move selected items to said unloading portion for transfer to said first conveyor by said diverter; said diverter, having a pick-up member, said diverter operable to move said pick-up member to pick up selected items positioned at said unloading portion in succession from said second conveyor and move said selected items from said unloading portion of said second conveyor to said receiving portion of said first conveyor and release said selected items in succession at said receiving portion of said second conveyor; whereby at least some of said items arriving at said diverter station on said first conveyor are diverted by said diverter onto said second conveyor.

In accordance with another aspect of the invention there is provide a conveyor system comprising: (a) a first conveyor having a moving conveyor carrier; (b) a second conveyor having a moving conveyor carrier; (c) a driving system to drive both said carriers at substantially the same speed; said first conveyor carrier being mounted in spaced, opposed relation to said second conveyor carrier to permit a deflectable product to be received between said first conveyor carrier and said second conveyor carrier and be carried between said carriers when said driving system is operated; at least one of said first conveyor carrier and said second conveyor carrier having a contoured inward facing surface configured and adapted to press against a surface of said deflectable product received between said first conveyor carrier and said second conveyor carrier, to deflect a side portion of said product relative to a medial portion of said product; whereby said deflectable product is bent along a longitudinal axis.

BRIEF DESCRIPTION OF THE DRAWINGS

In figures which illustrate embodiments of the invention, by way of example only:

FIG. 8 is a perspective view of part of the diverter of FIG. 1, in the direction of arrow 8 of FIG. 1;

Similar references are used in different figures to denote similar components.

DETAILED DESCRIPTION OF THE PREFERRED EMBODIMENT

Figure 1:
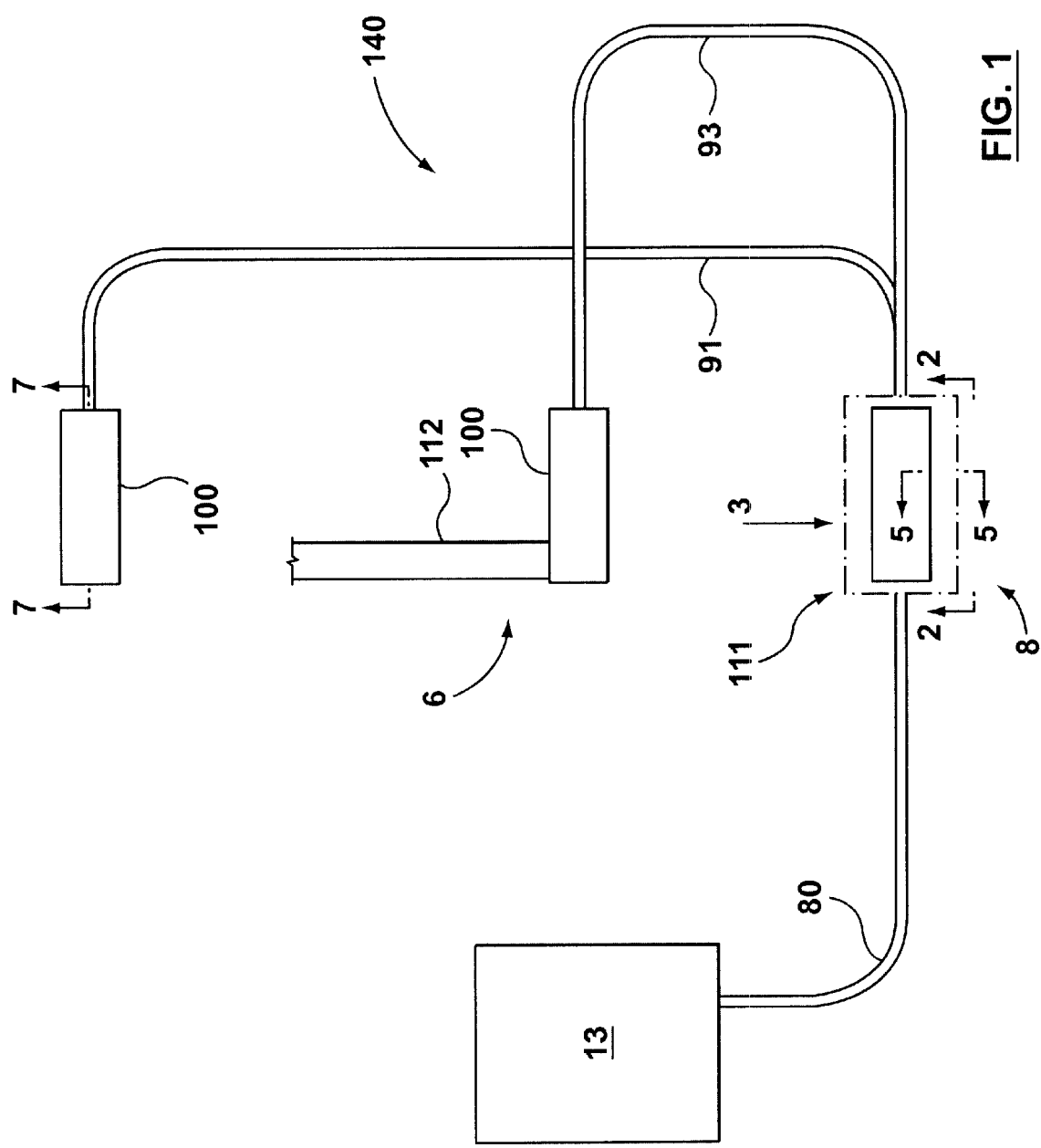
FIG. 1 is a schematic plan view of a conveyor system employing a rotary diverter positioned between a single upstream conveyor and two downstream conveyors terminating with separate bucket in-feed conveyor stations.
Figure 2:
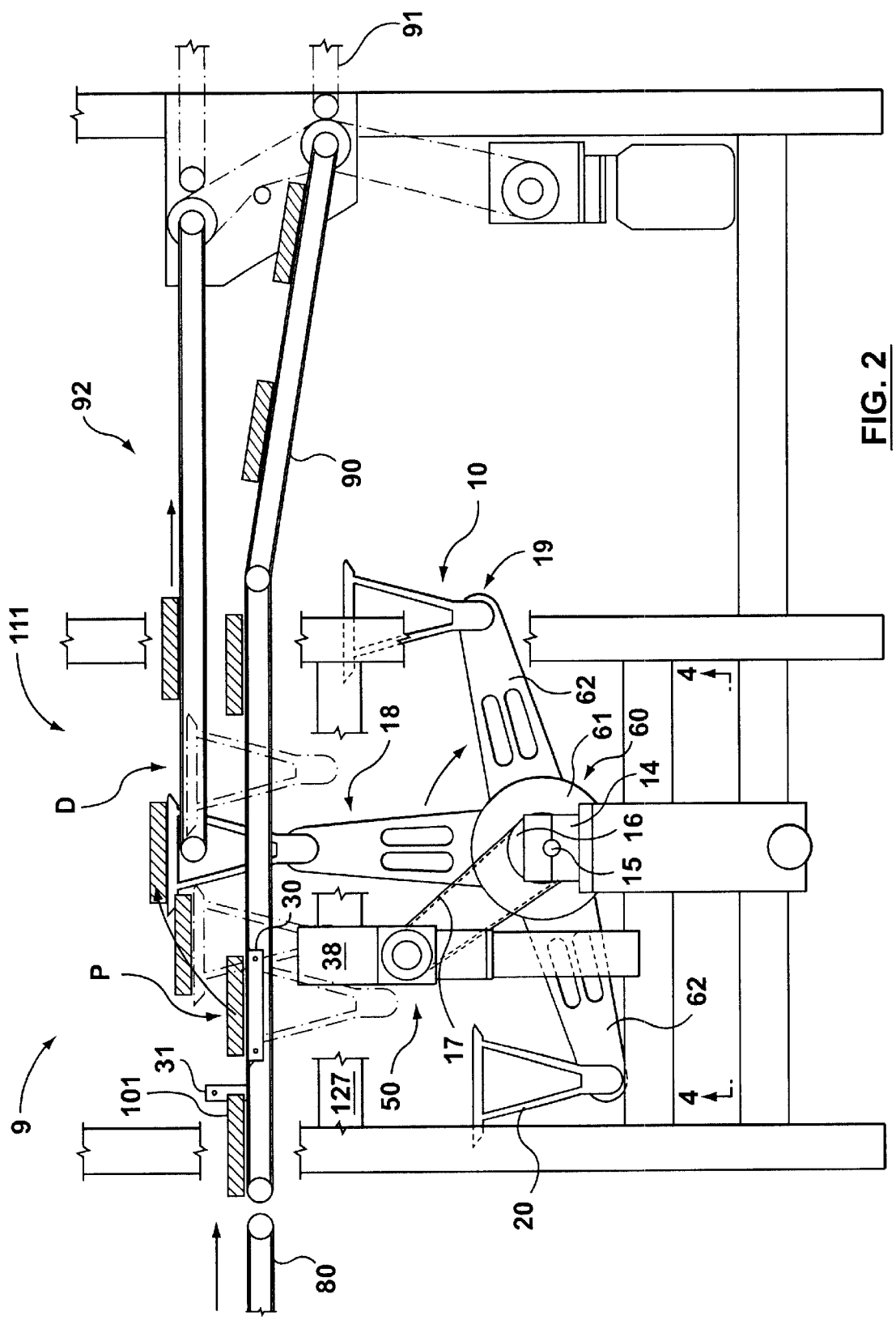
FIG. 2 illustrates an enlarged side elevation view of the rotary diverter taken in the direction of arrows 2—2 of FIG. 1.

With reference to FIGS. 1 and 2, a conveyor system generally designated 140, includes a rotary diverter station 111 having a diverter 10 positioned between a single conveyor 80 moving products from a product feed station 13 to diverter 10, and downstream conveyors 90, 92. Conveyors 80, 90 and 92 may be operate continuously or intermittently and at constant or variable speed. Conveyors 90,92, move product to conveyors 91, 93 respectively, which in turn each move product to separate bucket in-feed conveyor stations 100. As an item or product 101, such as a pre-arranged stack of fabric softener sheets, as shown in FIGS. 2, 3, 6, and 7C travels down conveyor 80, rotary diverter 10 selectively diverts product 101 from upstream conveyor 80 to downstream conveyor 92. Products 101 that are not diverted from upstream conveyor 80, continue along downstream conveyor 90. In this embodiment, every other product 101 on upstream conveyor 80 can be diverted to downstream conveyor 92 at diverter station 13, so that the resulting delivery rate of products 101 on each of downstream conveyors 90 and 92 is half of the delivery rate of products 101 on upstream conveyor 80. In this specification the term "delivery rate" means the number of products that pass a point on the conveyor path in any given period of time (eg. 5 units every second passing a point on the path). It is possible however, to vary the distribution of products diverted as between conveyor 90 and conveyor 92, as will be evident hereinafter.

The specific configuration of high-speed rotary diverter 10 is shown in FIGS. 2 to 5 and 8 to 9. With particular reference to FIG. 2 and FIG. 8, rotary diverter 10 has a left hand section 18 and a right hand section 19, which are constructed of the same parts and mounted substantially in the same way as each other, but in a way so that the operation of one section does not interfere with the operation of the other section during the transfer of products between conveyors. Sections 18 and 19 can be driven independently of each other, in that one can be driven at a rotational speed different than the other, but co-operate in that they work together to transfer products from one conveyor to another.

Unless otherwise indicated, for ease of reference, complementary left hand and right hand sections of rotary diverter 10 are denoted by similar reference numbers. In overview, each section 18, 19 has an arm each having a pair of opposed, integrally connected arm portion 62 which rotate about the centre of the arm at a central sun axis 15. Each arm portion has an end effector such as for example, an end effector 20, at its outer end. As arm portions 62 are rotated, they each are able to pick up a product 101 arriving on conveyor 80. In this embodiment, the pick-up of a product 101 by an end effector 20 is possible because of the co-operating configuration of the end effectors and the end portion of conveyor 80. Once product 101 is picked-up, the arm portions 62 then rotate and end effectors 20 lift the product 101 upwards in a vertical direction, following a curved path about axis of a sun shaft 15. As each arm portions 62 reaches conveyor 92, the end effector 20 and conveyor 92 are also co-operatively configured such that the end effector can deposit the product 101 onto conveyor 92. In the preferred embodiment, the arm portions 62 of section 18 co-operate with the arm sections of section 19, so that each section in turn will rotate an arm portion so that an end effector will transfer a product 101 from conveyor 80 to conveyor 92.

Referring to FIGS. 2, 3, 4 and 5, illustrating section 19 in detail, illustrate a rotary member 60 mounted for rotation in a vertical plane about the central axis X—X of sun shaft 15. Shaft 15 is fixedly mounted in stationary shaft block 14, which is secured to a frame. Thus, shaft 15 is held in a stationary position relative to the frame.

Figure 5:
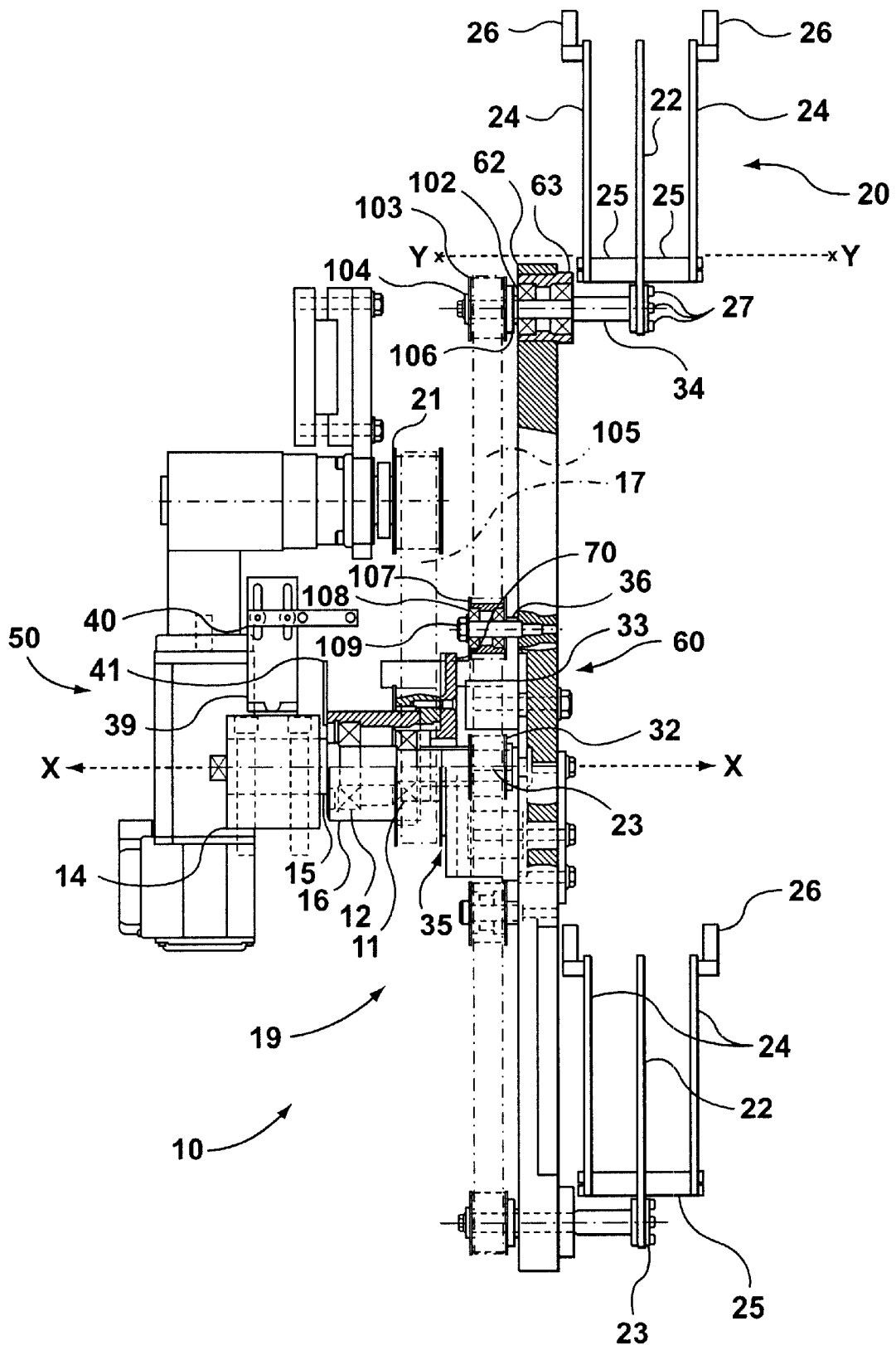
FIG. 5 is a cross-sectional view of part of the diverter of FIG. 1, in the direction of arrows 5—5 of FIG. 1.

As shown in FIG. 5, shaft 15 has a variable, stepped diameter, upon which various components are mounted. Main pulley 35 is rotatably mounted about sun shaft 15 on main bearings 11 and 12 (FIG. 5), which are retained by main bearing housing 16. Sun pulley 32 is concentrically mounted about shaft 15 using a key-way 23 (so sun pulley 32 is fixed relative to shaft 15). Main pulley 35 is mounted by bolts on bearing housing 16 and on rotary hub 70, so that all these parts (35, 16, 60) rotate together about shaft 15 as one unit. Accordingly, when main pulley 35 is rotated by a drive belt 17, rotary member 60 and bearing housing 16 wall also rotate together with main pulley 35, about shaft 15.

Rotary member 60 has two radial arm portions 62 that extend radially outward in a vertical plane, in opposite directions, from a round central portion 61. In other embodiments, each section's rotary member 60 could have only one radial arm or more than two radial arms may extend from said round central portion 61, although it will be appreciated that particularly in high speed applications it is desirable to ensure that during the rotation there is proper balancing of the loads resulting from rotation from the arms. Thus, there should be a relatively balanced placement of the arms around central portion 61, such as for example, three arm portions 62 spaced at 120 degrees from each other or four arm portions 62 spaced at 90 degrees to each other. Alternatively, counter-weights could be used if the placement of the end effectors 20 alone does not provide for proper balancing.

Planetary shaft bearings 102 are retained by a bushing 63 in the outward end of each radial arm portions 62. A planetary shaft 34 is rotatably mounted through each bushing 63 on bearings 102. Planetary shafts 34 extend through either side of radial arm portions 62 along an axis parallel to sun shaft 15.

On the same side of radial arm portions 62 that main pulley 35 is mounted to rotary member 60, planetary pulleys 103 are fixedly mounted on planetary shafts 34 and thus will rotate with shafts 34. Planetary pulleys 103 are retained in place by flat washers 104 bolted to planetary shaft 34. A planetary pulley spacer 106 prevents frictional contact between planetary pulleys 103 and radial arms 62.

Figure 3:
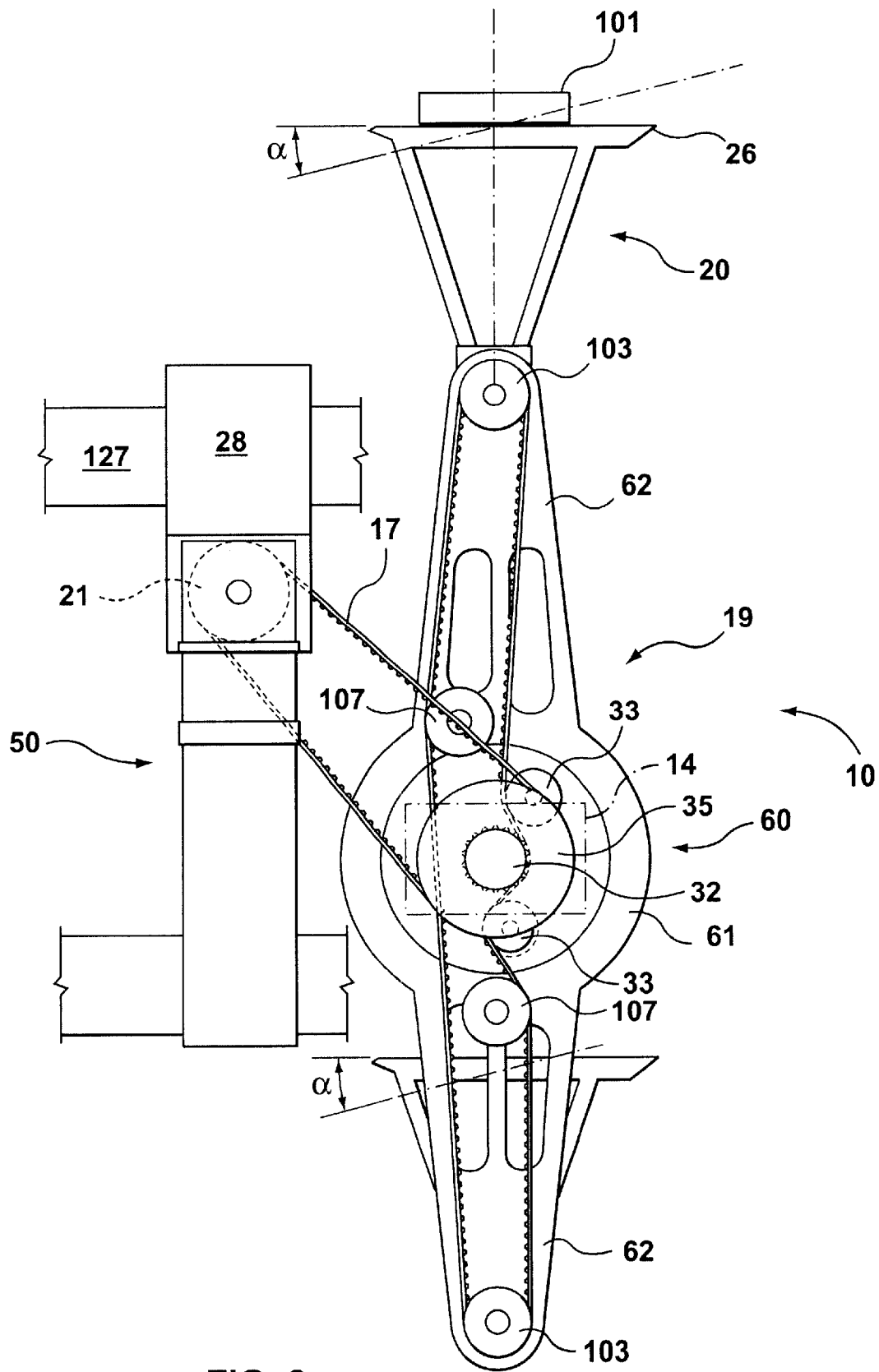
FIG. 3 is an enlarged side view of part of the diverter of FIG. 1, in the direction of arrow 3 of FIG. 1.
Figure 4:
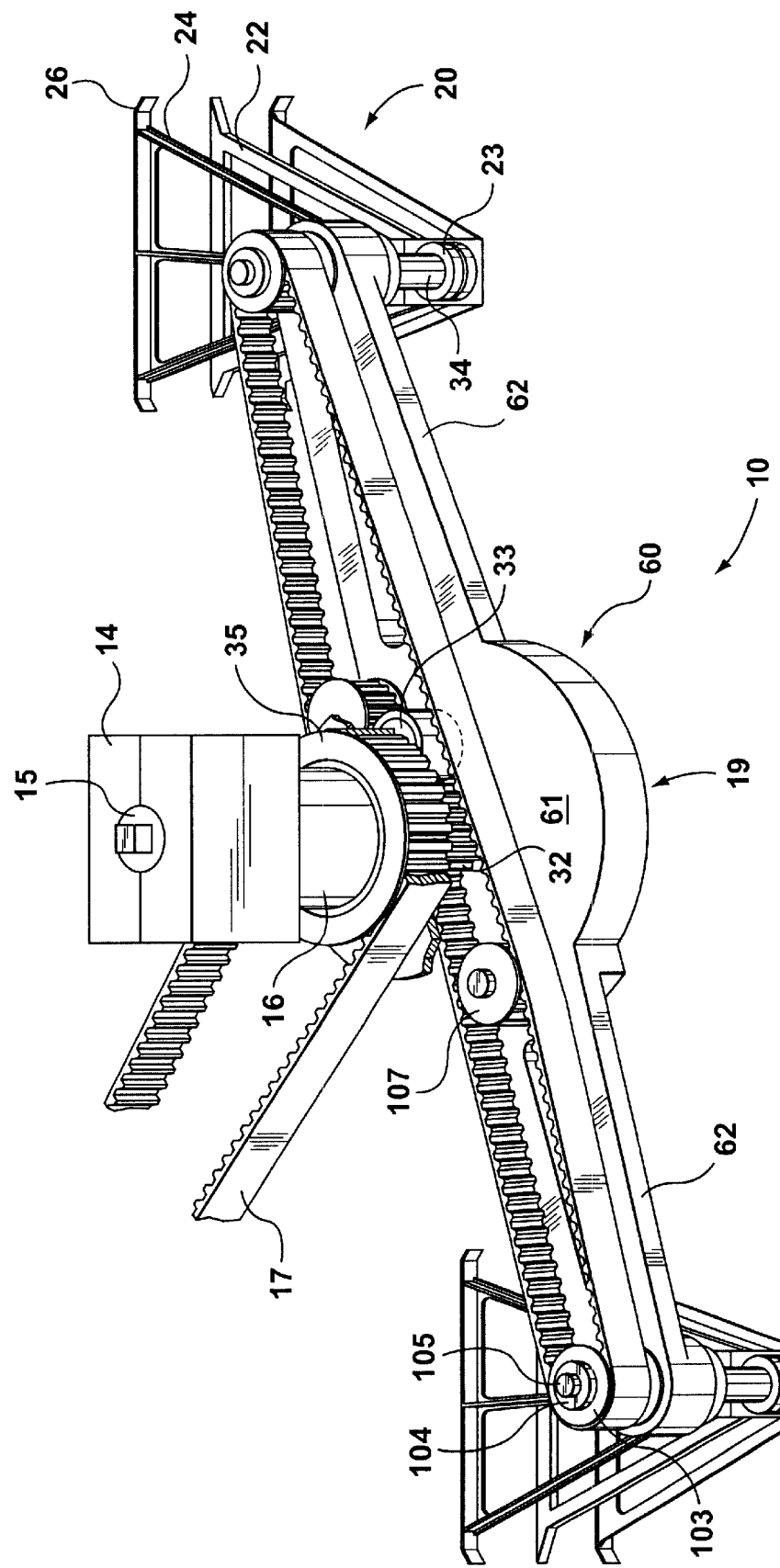
FIG. 4 is a perspective view of another part of the diverter of FIG. 1, taken in the direction of arrows 4—4 of FIG. 2.
Figure 9:
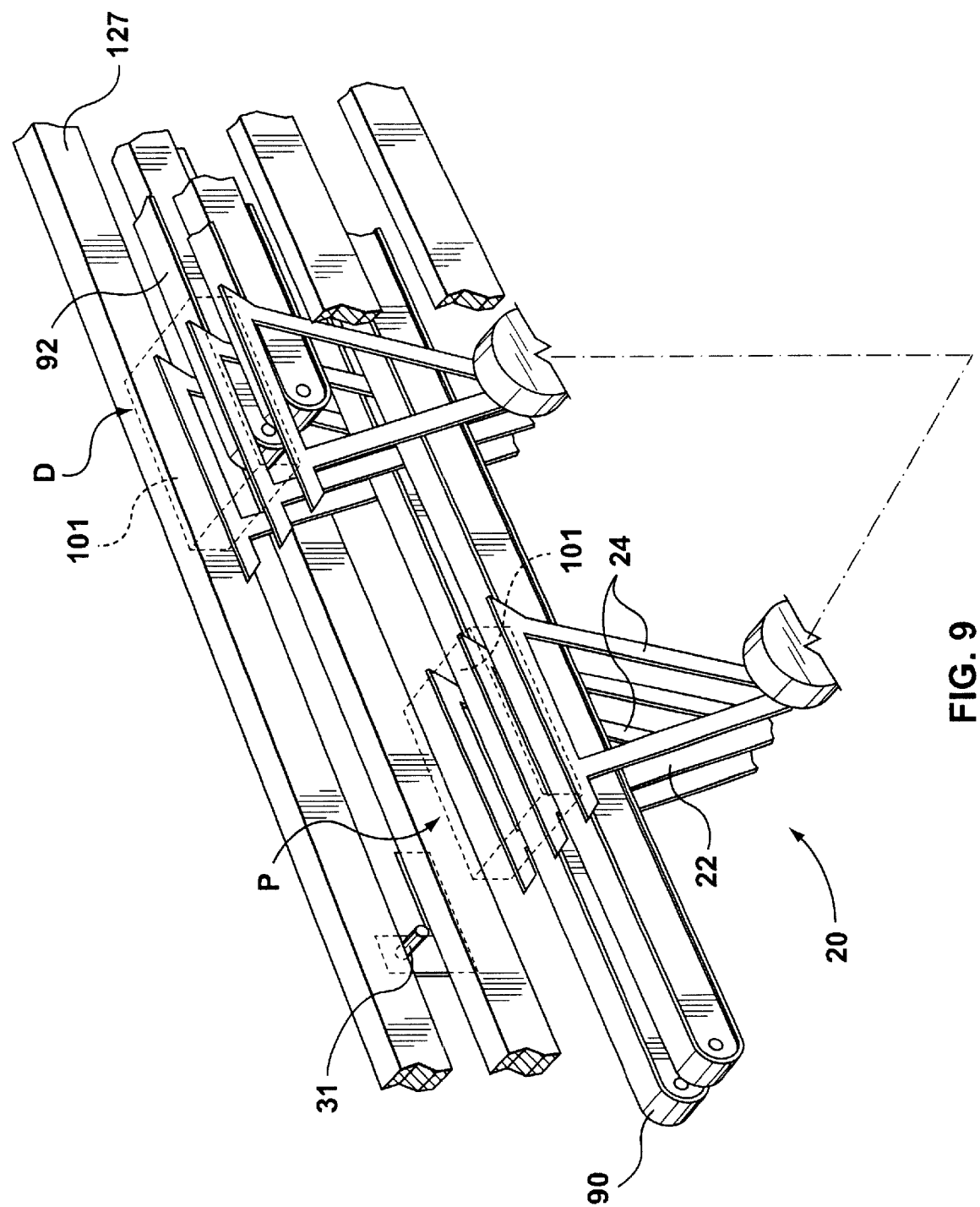
FIG. 9 is a perspective view of a part of the diverter of FIG. 2, in the direction of arrow 9 of FIG. 2.

Terminating each planetary shaft 34, on the end opposite from which planetary pulley 103 is a flange 23 (FIGS. 3 to 5). An end effector 20 extends vertically from each flange 23. Each end effector 20 comprises a centre lifter segment 22 (FIGS. 4 and 5) bolted with bolts 27 to flange 23 and two side lifter segments 24 bolted through lifter segment separators 25, on either side of centre lifter segment 22. Side lifter segments 24 are separated in parallel relation from centre lifter segment 22 by lifter segment separators 25 (FIG. 5). Above horizontal plane Y—Y which is aligned with the top surface of lifter segments 25, it is possible for conveyor belt 80, 90, 92 to pass between a side lifter segment 24 and centre lifter segment 22 (FIG. 9).

In this embodiment, centre lifter segment 22 and side lifter segments 24 are generally triangularly shaped wherein one side of said triangular lifting segments of each end effector 20 define a flat lifting plane that is in parallel orientation to the centre axis of planetary shaft 34. The bases of side lifter segments 24 are fitted with product guide rails 26 in opposing parallel relation, which define the outer side edges of said lifting plane (FIG. 5).

End effector 20 could be comprised of a variety of shapes, structures or mechanisms capable of transferring a selected product 101 from a pickup point P to a delivery point D. For example, depending on the nature and configuration of product 101, the rotary path of radial arm 62, and the configuration of the conveyors from which the product is to be transferred from and to, end effector 20 could be for example any of a platform, hook, pair of rails, magnet, suction cup, pincer or clamp.

Rotary member 60 is driven by a drive mechanism 50 (FIGS. 2, 3 and 5), which is clamped to a stationary portion of work frame 127 by clamping plate 38. Drive mechanism 50 drives a drive pulley 21, which transfers power to main pulley 35 through drive belt 17 to turn main pulley 35. Thus, the rotation of drive pulley 21 causes main pulley 35 to rotate. As pulley 35 rotates, so does rotary member 60, along with its arm portions 62. As arm portions 62 rotate, the position of planetary shafts 34 and planetary pulleys 103 move relative to sun pulley 32 is altered. As sun pulley 32 is fixed on main shaft 15, the interconnection of sun pulley 32 to planetary pulley 103 through timing belt 105 will cause pulley 103, shaft 34 and effector 20 to rotate in the opposite direction to the rotation of arm portions 62. So long as the turning belt 105 and sun pulley 32 counteract precisely the rotation of arm portions 62, then the orientation of effector 20 will not be changed during rotation of arm portions 62 (eg. in the preferred embodiment the orientation of the top surface of end effector 20 will remain horizontal). This will be the case if the outer diameter of sun pulley 32 is the same as the outer diameter of planetary pulley 103, with each typically having the same number, and same spacing of teeth.

By way of further explanation, timing belt 105 causes the rotation of each planetary pulley 103 as it is driven around stationery sun pulley 32 in order to maintain the lifting plane of each end effector 20 in a constant (eg. horizontal) position during the rotation of rotary member 60. The timing belt 105, planetary pulleys 103 and sun pulley 32 are arranged so that the ratio of end effector 20 rotation to rotary member 60 rotation is set to 1:–1, wherein each end effector 20 will rotate one revolution in the opposite direction for every revolution of rotary member 60. It may of course be desirable in some applications to vary the orientation of position of the plane or one or more of the effectors during its change in position from pick-up to drop-off of the product. This could be accomplished in another set-up by providing gearing to effect the rotation of the end effectors and by varying the gear ratios of the sun pulley 32 to the planetary pulley 103.

A way of simply varying the orientation of the end effector relative to the arm portions 62 is to make an adjustment to shaft 15 by rotating it (while the drive is disengaged), such a rotation will cause sun pulley 32 to rotate, thus then turning belt 105 rotating end effector 20. Thus, as shown in outline in FIG. 3, both end effectors 20 orientation can be altered by angle alpha, by a corresponding rotation of shaft 15 relative to rotary member 60.

Two idler pulleys 107 are rotatably mounted by idler bearings 108 on shoulder screws 109, which are attached to the circular portion of rotary member 60. Idler pulley spacers 36 prevent frictional contact between idler pulleys 107 and rotary member 60. Idler pulleys 107 are arranged on opposite sides of sun pulley 32 and are situated inside timing belt 105. During high speed rotation, idler pulleys 107 assist in maintaining the shape and proper positioning of, and provide an efficient path for, timing belt 105, which, in turn, better maintains the orientation of end effectors 20. Two tension rollers 33 are rotatably mounted to the circular portion of rotary member 60. As best seen in FIG. 3, tension rollers 33 are arranged on opposite sides of sun pulley 32 and outside of timing belt 105 so as to urge timing belt 105 into better contact with sun pulley 32.

Sensor bracket 40 (FIG. 5) is mounted to shaft block 14 by sensor mounting bracket 39. A flag 41 associated with each of arm portions 62 is attached to bearing housing 16 so that flag 41 rotates with bearing housing 16. An optical sensor, or any other conventional, suitable sensor ("sensor 1"), not shown, is mounted to sensor bracket 40 to monitor the position of flag 41. A conventional programmable logic controller ("PLC1"), not shown, or any other conventional electronic control mechanism, communicates with drive mechanism 50 and sensor 1. The angular position of each radial arm portions 62 and the corresponding position of the lifting plane of end effectors 20 is ascertained by sensor 1 sensing the position of flag 41 and sending a signal to PLC1. Accordingly, once sensor 1 detects the flag 41, PLC1 know the position of the lifting plane of end effectors 20 is at the "homing" or "ready" position for the end effector 20. Once identified to be in the homing position (angular position H in FIG. 11), an end effector 20 can be held there until it is ready to be rotated to pick up a product 101.

A second conventional optical or other suitable sensor 31 (FIG.2), also in communication with PLC1 is mounted to work frame 127 or a stationary portion of upstream of a pick-up point P, on or adjacent conveyor 90 or conveyor 80. Sensor 31 is appropriately configured to monitor the position of products 101 on upstream conveyor 80 and sends a signal to PLC1 when a product 101 approaches designated pickup point P on upstream conveyor 80. A third conventional optical or other suitable sensor 30, also in communication with PLC1 could optionally be utilized to confirm the synchronization of movement of product 101 and end effector 20 pick-up point, as is hereinafter described. Sensor 30 can be mounted to work frame 27 or a stationary portion of upstream conveyor 80. Sensor 30 sends a signal to PLC1 when a product 101 is exactly at a designated pick-up point P on upstream conveyor 80.

The position of the pickup point P is programmed into PLC1 and from this reference point, the rotary members 60 are appropriately rotated in accordance with the angular displacement from this reference point. Also, PLC1 is programmed such that only certain selected products of the group of products 101 are diverted by diverter 10 from conveyor 80 onto conveyor 92, whereas other products are allowed to proceed on to conveyor 92. Thus, PLC1 will upon the identification of a product 101 approaching pickup point P, determine if this is a product which should be diverted to conveyor 92, and then either give or not give an instruction to drive mechanism to rotate an arm portion 62 of one of sections 18 or 19.

Upon receipt of an appropriate signal from sensor 31, PLC1 will if designated for diversion, instruct drive mechanism 50 to rotate drive pulley 21 to move a lifting plane of an end effector 20 from its homing position H, to underneath the pickup point P on upstream conveyor 80 in order to position end effector 20 for pick up of a selected product 101. Under the control of PLC1, the drive mechanism 50 will rotate drive pulley 21 to move a lifting plane of an end effector 20 through the pickup point P on upstream conveyor 80 to obtain the selected product 101 (FIG. 9). After a selected product 101 is obtained by an end effector 20, PLC1 controls drive mechanism 50 in continuing to rotate drive pulley 21 until the lifting plane of end effector 20 crosses the plane of downstream conveyor 92 and deposits product 101 at the delivery point D (FIG. 9).

PLC1 controls the speed of rotation of drive pulley 21. The rotational speed of the pulley 21 can be selected such that the horizontal component of velocity of an end effector 20 is substantially equal to the horizontal velocity of the upstream conveyor 80 when the lifting plane of end effector 20 obtains a selected product 101 at the pickup point P. Similarly, PLC1 can control the rotation of drive pulley 21 so that the horizontal component of velocity of an end effector 20 is substantially equal to the horizontal velocity of the downstream conveyor 92 when the lifting plane of end effector 20 delivers a selected product 101 at the delivery point D. By substantially matching the horizontal velocity of the end effector 20 with the horizontal velocity of the upstream conveyor 80 and downstream conveyor 92 at the pickup and delivery points P and D, sudden acceleration and deceleration of product 101 is reduced during the diverting process and the risk of misalignment is accordingly diminished. The speeds at which the conveyors will operate are input into the PLC1, which can then determine an appropriate velocity profile for the end effector 20 (for example see FIG. 10).

Figure 10:
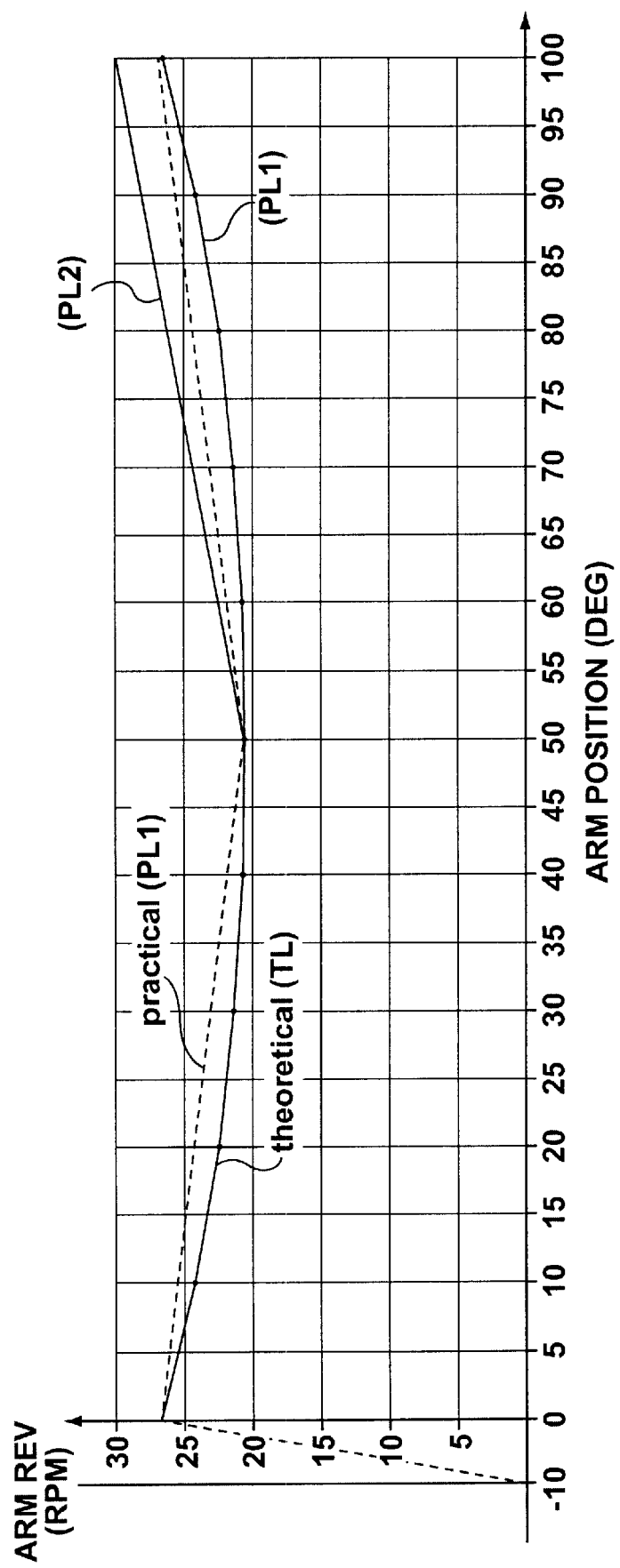
FIG. 10 is a chart illustrating how rotational speed of part of the diverter is varied during rotation.
Figure 11:
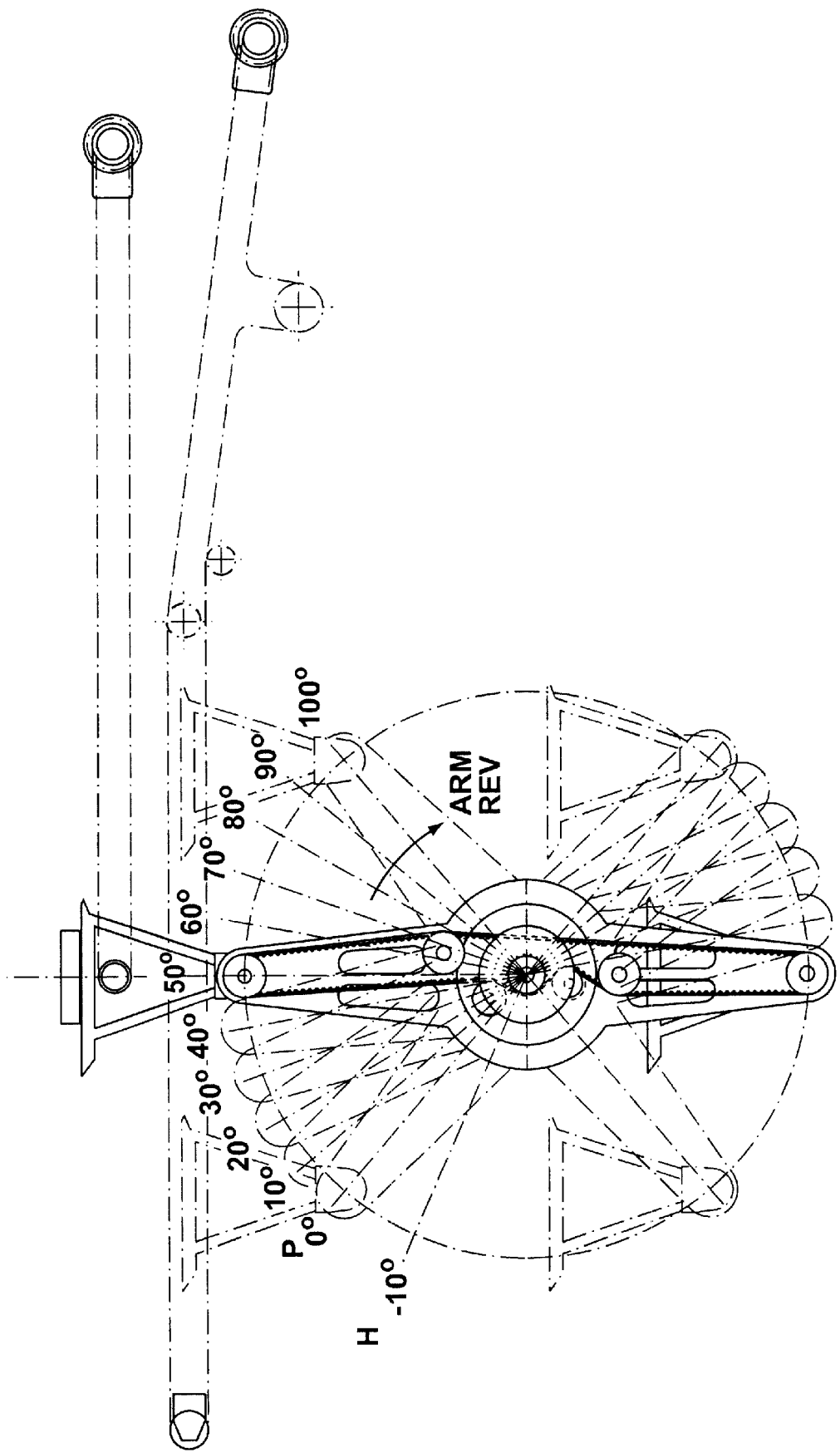
FIG. 11 is a schematic side elevation view, similar to FIG. 2.

With reference to FIGS. 10 and 11, the rotational speed of an arm portion 62 is shown as the arm moves from the homing position H (–10 degrees in FIG. 11) to the pickup position P (0 degrees in FIG. 11) through the drop-off position D to approximately 100 degrees as shown in FIG. 11. The curve marked "TL" is the speed curve if the linear speed of the end effector is to remain constant as it rotates from position P through position D to 100 degrees rotation. In one practical embodiment, the rotational speed is controlled by PLC1 to follow line PL1 between 0 degrees (position P) and just past 50 degrees at drop off position D. In a preferred embodiment, the speed can actually be increased once product 101 is deposited on conveyor 92, so that it quickly moves away from the product. Thus, the rotational speed after release of product, may be programmed to follow line PL2 between drop-off to 100 degrees. This increase in speed, particularly the linear component, will ensure that any following product 101 moving along conveyor 90 and not being diverted will not have its movement interfered with by end effector 20 as it passes back through conveyor 90 during its further rotation.

The drive mechanism 50 is a servo drive, so that the speed of rotation or radial arms 62 can be varied during the rotation, as discussed above. With respect to the two sections 18 and 19, each of their rotary members 60 are driven separately, so that their speeds at any particular time, can be different. This provides for much greater flexibility in the operation of the diverter 10. For example, the effector 20 of one section 18 can be stationary at position H, while an effector 20 of the other section 19 can be moving while dropping a product at position D.

As illustrated in FIG. 2 and FIG. 9, diverter 10 is generally positioned between upstream conveyor 80 and downstream conveyors 90 and 92. In the present embodiment, upstream conveyor 80 and downstream conveyors 90 and 92 each comprise two parallel carrying belts (not shown) in the area between the pickup point P and delivery point D. The belts are separated to provide enough space for centre lifter segment 22 to pass in between the belts and for side lifter segments 24 to pass outside the belts when an end effector 20 crosses the plane of upstream and downstream conveyors 80 and 92. It will be understood that the number of belts comprising conveyors 80 and 92, both inside and outside the above noted area, may be greater or less than two.

Downstream conveyor 92 is vertically displaced and from and vertically aligned with, upstream conveyor 80 and they are aligned in a parallel plane to the plane of rotation of rotary member 60. The vertical displacement between downstream conveyor 92 and upstream conveyor 80 is sufficient to permit non-diverted product 101 to continue along upstream conveyor 80 to downstream conveyor 90 without contacting the underside of downstream conveyor 92, but less that the distance between plane Y—Y of each end effector 20 and the lifting plane of end effector 20, so that lifter segment separators 25 do not contact the underside of upstream conveyor 80 during diversion of product 101.

As rotary member 60 rotates in a clockwise direction, the top surfaces of side segments 24 and centre segment 22 of end effectors 20 define a circular path. In the upper left quadrant of the lifting plane path, the lifting plane has a lifting (upward) and translating (forward) component of motion. In the upper right quadrant of the circular path the lifting plane has a lowering (downward) and translating (forward) component of motion. In the particular arrangement of the preferred embodiment shown in FIG. 2. and FIG. 9, downstream conveyor 92 is positioned above upstream conveyor 80, pickup point P is positioned in the upper left quadrant of the circular path and delivery point D is positioned in the upper right quadrant of the lifting plane path. With this arrangement selected product 101 is raised by the lifting plane of end effector 20 at pickup point P as it crosses upstream conveyor 80 and is lowered onto delivery point D as it crosses downstream conveyor 92. As explained above, PLC1 controls the rotation of drive pulley 21 to substantially match the translating component of the lifting plane's motion with the translating component of the upstream conveyor 80 at the pickup point P and of the downstream conveyor 92 at the delivery point D. It will also be noted from FIG. 2, that throughout the rotation from pick-up and particularly at drop-off, the vertical component of velocity will be relatively small compared to the horizontal component, and provides for relatively small accelerations in the vertical direction. Furthermore, with respect to certain flimsy products such as a stack of fabric softeners, any vertical acceleration during pick-up will actually serve to stabilize the product as it is pushed against the under supporting segments of end effectors 20.

As referenced above, in this embodiment, there are two sections 18 and 19. It will be observed in FIG. 8 that left hand section 18 and right hand section 19 are arranged in opposing relation to one another so that the lifting plane paths of their respective end effectors 20 are concentric and travel in the same vertical plane. This arrangement may be achieved by orienting the sun shafts 15 (as shown in FIG. 5 for right hand section 19) of both left hand section 18 and right hand section 19 along the same axis of rotation and by aligning both sets of centre lifter segments 22 on the same plane of rotation.

Left hand section 18 and right hand section 19 may be controlled by a single programmable logic controller, by separate programmable logic controllers in communication with one another, or some other combination of conventional controller devices. The radial arms 72 of left hand section 18 and of right hand section 19 maintain a minimum angular separation so as to prevent the lifting plane of an end effector 20 of one radial arm 60 from contacting the planetary shaft 34 of the next radial arm 60.

With reference to FIG. 2, the employment of both a left hand section 18 and a right hand section 19, described above, increases the capacity of products 101 that may be diverted from upstream conveyor 80. Moreover, if left hand section 18 and right hand section 19 are controlled and are driven independently of each other, the end effector 20 of the one section may be positioned under pickup point P in preparation to obtain a selected product 101, while the end effector 20 of the other section is still in the process of diverting a previously selected product 101.

It will be appreciated many different variations to the preferred embodiment described above are possible. For example, multiple radial arms may be provided in a single section rotary diverter instead of or in addition to positioning a left hand section 18 and a right hand section 19 in opposite arrangement. The path of the end effectors does not necessarily have to be circular.

Other variations of the diverter station are possible. For example, it would be possible to arrange diverter 10 to consolidate two streams of product arriving on two separate conveyors, into a single stream of products leaving on a single conveyor. This would be accomplished by the diverter picking up product from one of the incoming conveyors, and depositing the product on an outgoing conveyor, that also receives product from an second incoming conveyor.

Once product 101 reaches the end of downstream conveyors 90 it can be transferred to a conveyor 91 (FIG. 2) which could be operated at a lower speed, with the result that the products can again have their spacing decreased, now some product has been diverted to conveyor 92. Likewise product carried on conveyor 92 can be transferred to a slower conveyor 93 (FIG. 2) with the same effect.

Figure 6:
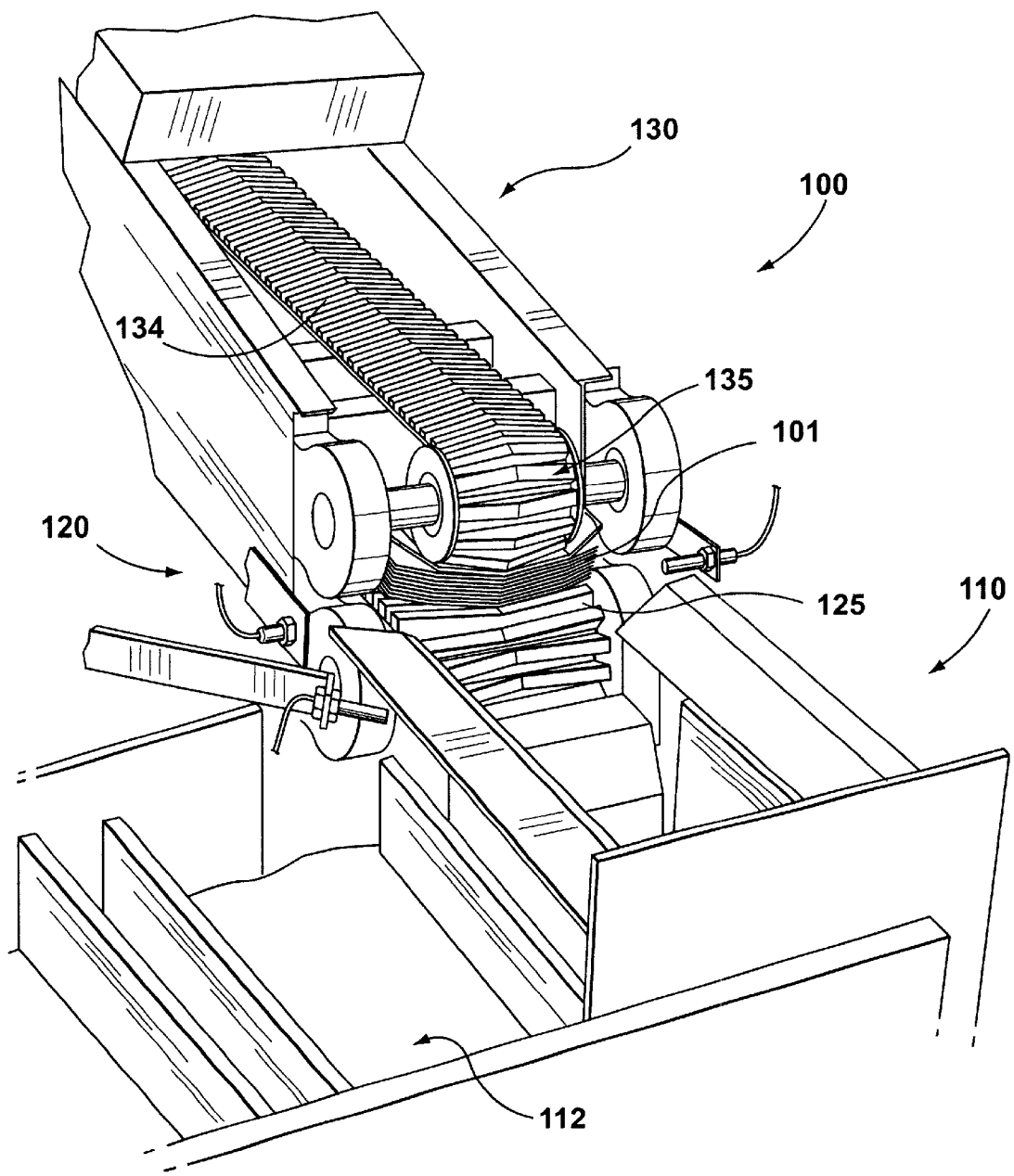
FIG. 6 is a perspective view of an in-feed conveyor station in the general direction of arrow 6 of FIG. 1.

At the end of conveyors 91, 93 are in-feed conveyor stations 100, load products 101 into buckets 112, shown in FIG. 6, carried on auto-loader 110. When bucket 112 is filled with a predetermined amount of product 101, auto-loader 110 advances said filled bucket 112 and positions an empty bucket 112 in its place. Product 101 in filled buckets 112 is eventually transferred to a packaging conveyor (not shown)

for transport to a packaging machine (not shown) for packaging. The use of auto-loaders 110, packaging conveyors and packaging machines to load and package various products positioned in buckets is well known to those skilled in the art.

Figure 7:
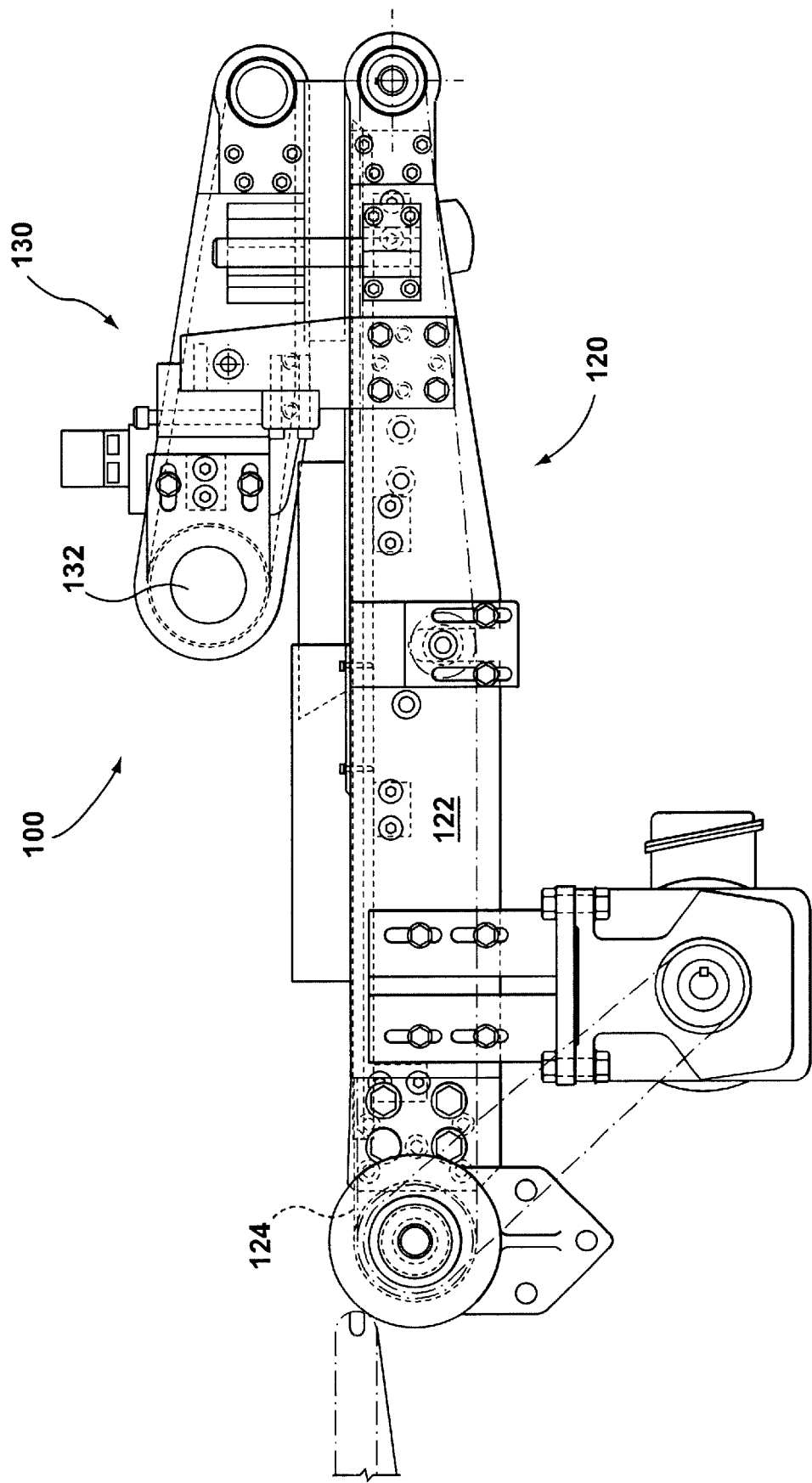
FIG. 7 is a cross-sectional side view of a bucket in-feed station in the system of FIG. 1, in the direction of arrows 7—7 of FIG. 1.

With reference to FIGS. 6 and 7, in-feed conveyor station 100 has a top conveyor portion 130 in fixed vertical displacement from a bottom conveyor portion 120. Bottom portion 120 comprises of a conveyor 122 having a bottom conveyor carrier such as belt 124 that is driven in a conventional manner through in-feed conveyor station 100. As illustrated in FIG. 6, bottom conveyor carrier such as belt 124 has mounted to it a series of concave up (or generally V-shaped) transverse members 125 (one of which is separately shown in FIG. 7C) mounted along its length. Bottom conveyor 120 is positioned at the terminal end of downstream conveyor 90 or 92 so that any product 101 transported by downstream conveyors 90 or 92 is received by a bottom conveyor 120 and can be transported at substantially the same velocity by bottom conveyor belt 124.

Figure 7A:
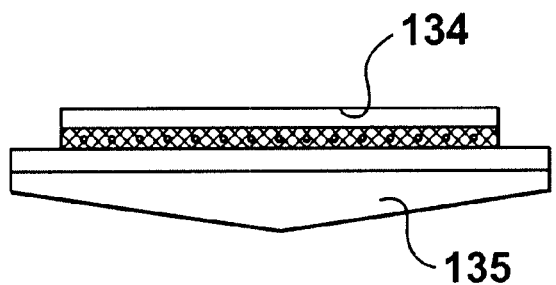
FIG. 7A is a cross-sectional view of a convex transverse member and top conveyor belt of the in-feed station in FIG. 7.

Top portion 130 includes a conveyor 132 on which a top conveyor carrier such as belt 134 can be driven in a conventional manner. As illustrated in FIG. 6, top conveyor belt 134 has mounted along its length a series of convex down (also generally V-shaped) transverse members 135 (one of which is separately shown in FIG. 7A). In operation, top conveyor belt 134 revolves in an opposite direction to bottom conveyor belt 124 so that the velocity of the bottom surface of top conveyor belt 134 is substantially equal to the velocity of the top surface of bottom conveyor belt 124.

Figure 7B:
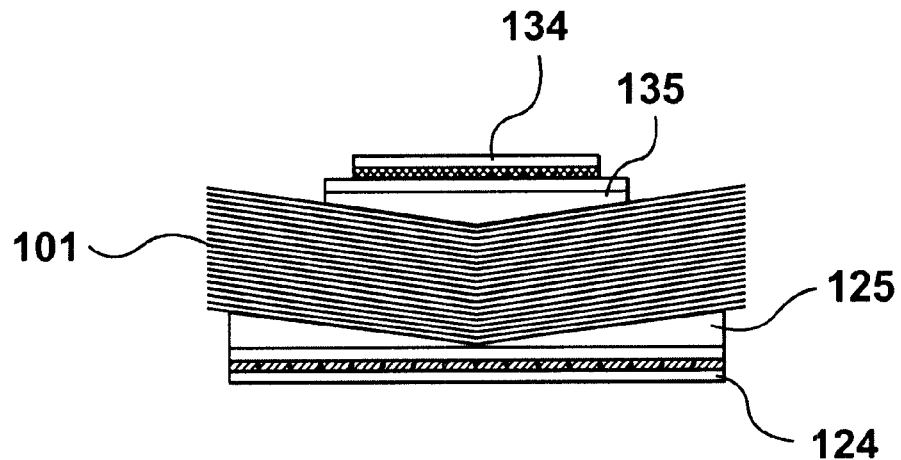
FIG. 7B is a cross-sectional view of a product bent between a convex transverse member of FIG. 7A and a concave transverse member of FIG. 7B.
Figure 7C:
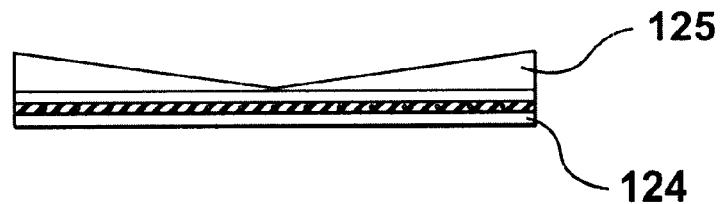
FIG. 7C is a cross-sectional view of a concave transverse member and bottom conveyor belt of the in-feed station in FIG. 7.

Product 101 is a product or item that can be deformed when a load is applied to it by being pinched between members 125 and 135 of the bottom and top conveyors respectively. As illustrated in FIG. 7, the vertical separation between the bottom surface of top conveyor belt 134 and the top surface of bottom conveyor belt 124 diminishes from upstream to downstream. The upstream separation diminishes from a separation greater than the height of product 101 to a separation less than the height of product 101, to compress the product 101. As product 101 is moved along by bottom belt 124 under top portion 130 it is gradually pinched between bottom conveyor belt 124 and top conveyor belt 134. As product 101 is pinched by belts 124 and 134 (shown in FIG. 7B), convex transverse members 135 and concave transverse members 125 gently bend product 101 along its longitudinal centre line of motion. It will be appreciated that flexible products, like paper or fabric softener sheets, are more resistant to bending in one direction when a bend is introduced in the transverse direction. Accordingly, by bending product 101 along a central longitudinal axis, in-feed conveyor station 100 makes product 101 more resistant to bending in the transverse direction (ie. about a transverse axis) and, therefore, less likely to fold or become misaligned as it is loaded into bucket 112.

The conveyor system referred above can be operated at relatively high speeds, including the diverter 10. For example, in the preferred embodiment, the conveyors 80, 90 and 92 can be operated with a linear speed of in the order of 250 feet per minute.

Numerous other modifications, variations and adaptations may be made to the particular embodiments of the invention described above without departing from the scope of the invention, which is defined in the claims.

What is claimed is:

1. An apparatus for transferring selected products of a plurality of products carried on a first path by a first continuous movement conveyor, said selected products not comprising all of said plurality of products carried by said first conveyor, from a pickup position on said first conveyor to a delivery position so as to be diverted to travel on a second path on a second continuous movement conveyor, the remaining products of said plurality of products continuing to be moved on said first path, said second conveyor being vertically displaced relative to said first conveyor, said apparatus comprising:

(a) a member having a transfer effector, said member mounted to a frame for movement to move said transfer effector between said pick-up position and said delivery position;

(b) a drive mechanism for moving said member; and (c) a control system operable to control the speed and position of said transfer effector;

said transfer effector being adapted for retrieving said selected products in turn at said pick-up position and depositing said selected products at said delivery position, wherein said control system controls the speed and position of said transfer effector from retrieval of said selected products at said pickup position to delivery of said selected product at said delivery position, said selected products moving continuously and generally longitudinally from said first conveyor to said pickup position and then to said delivery position and along said second path on said second conveyor, said remaining products moving continuously and generally longitudinally from said first conveyor through pickup position and continuing on said first path.

2. An apparatus as claimed in claim 1 wherein said member comprises an arm mounted for cyclical movement, and wherein said transfer effector is a lifting effector which is moved in a cyclical path with said arm when said arm is moved by said drive mechanism.

3. An apparatus as claimed in claim 2, wherein said arm is a radial arm mounted for rotational movement about an axis, and wherein said lifting effector is moved in an arcuate path about said axis.

4. An apparatus as claimed in claim 3 wherein said arcuate path is a circular path.

5. The apparatus of claim 1 wherein said control system is adapted to control the horizontal velocity of said transfer effector at said pickup position to substantially equal the horizontal velocity of said first conveyor when said selected products are retrieved from said first conveyor at said pickup position.

6. The apparatus of claim 1 wherein said control system is adapted to control the horizontal velocity of said transfer effector at said delivery position to substantially match the horizontal velocity of said second conveyor when said selected products are delivered to said second conveyor at said delivery position.

7. The apparatus of claim 1 wherein said control system is adapted to control the horizontal velocity of said transfer effector at said pickup position to substantially match the horizontal velocity of said first conveyor when said selected products are picked-up from said first conveyor at said pickup position, and wherein said control system controls horizontal velocity of said transfer effector at said delivery position to substantially match horizontal velocity of said second conveyor when said selected products are delivered to said first conveyor at said delivery position.

8. The apparatus of claim 3 wherein said control system is adapted to control the horizontal velocity of said lifting effector at said pickup position to substantially match the horizontal velocity of said first conveyor when said selected products are picked-up from said first conveyor at said pickup position, and wherein said control system controls horizontal velocity of said lifting effector at said delivery position to substantially match horizontal velocity of said second conveyor when said selected products are delivered to said first conveyor at said delivery position.

9. An apparatus as claimed in claim 8 further comprising a first sensor in communication with said control system for detecting an indicator of the position of said lifting effector.

10. An apparatus as claimed in claim 9 wherein said first sensor senses an indicator of the angular position of said rotary member when said lifting effector is at a ready position.

11. An apparatus as claimed in claim 10 further comprising a second sensor in communication with said control system for sensing said selected products are at or approaching said pick-up position and wherein said control system operates said drive mechanism to move said lifting effector to said pickup position when said second sensor senses said selected products are approaching said pickup position.

12. The apparatus of claim 11 further comprising a third sensor in communication with said control system said said third sensor for detecting when said selected products are at said pickup position, said control system adapted to confirm through said first and third sensors, the synchronized positioning of said lifting effector and said selected products.

13. An apparatus as claimed in claim 2, wherein said first conveyor comprises at least two spaced apart conveyor carriers and wherein said lifting effector comprises at least one lifting segment adapted to lift a selected product, said at least one lifting segment and said conveyor belts of said first conveyor, being configured such that said lifting segment can be received between said carriers, whereby in operation said arm can be moved by said driving mechanism to move said lifting segment from a first position below a selected product positioned on said two spaced apart carriers of said first conveyor, to a second position wherein said at least one lifting segment lifts said selected product is clear of said first conveyor.

14. An apparatus as claimed in claim 13, wherein said second conveyor comprises at least two spaced apart conveyor carriers, said conveyor carriers of said second conveyor and said lifting segment being co-operatively configured to permit said lifting segment to be at least partially received between said conveyor carriers, and wherein in operation, said arm can be moved by said driving mechanism to move said lifting segment carrying said selected product from said second position to a third position where said selected product is deposited on said second conveyor, and wherein in operation said lifting segment passes between said at least two spaced apart conveyor carriers of said second conveyor to lower said selected product onto said second conveyor.

15. An apparatus as claimed in claim 14, wherein said conveyor carriers of said first and second conveyors comprise carrier belts.

16. An apparatus as claimed in claim 15, wherein in operation, said driving mechanism moves said arm to move said lifting segment from said third position back to said first position below a second selected product.

17. A system for diverting selected products from non-selected products in a stream of a plurality of products moving along a first path to a second path, said selected products not comprising all of said stream of products, said systems comprising:

(a) a first continuous conveyor;
(b) a second continuous conveyor having a product delivery position that is vertically displaced from said first conveyor;

(c) a rotary diverter for acquiring said selected products from said first conveyor generally longitudinally at substantially the same horizontal velocity as said first conveyor, and moving said selected products continuously and generally longitudinally, and for delivering said selected product generally longitudinally onto said second conveyor at said product delivery position at substantially the same horizontal velocity as said second conveyor; and (d) a pair of in-feed conveyor stations, one of said in-feed conveyor stations positioned at the terminal end of said first conveyor for receiving said non-selected product, and the other one of said in-feed conveyor stations positioned at the terminal end of said second conveyor for receiving said selected product;

said non-selected products not being acquired by said rotary diverter, said non-selected products moving generally longitudinally and continuously past said rotary diverter.

18. A system for diverting selected product from non-selected product comprising:

(a) a first conveyor;
(b) a second conveyor vertically displaced from said first conveyor;
(c) a rotary diverter for acquiring said selected product from said first conveyor at substantially the same horizontal velocity as said first conveyor, and for delivering said selected product onto said second conveyor at substantially the same horizontal velocity as said second conveyor; and
(d) a pair of in-feed conveyor stations, one of said in-feed conveyor stations positioned at the terminal end of said first conveyor for receiving said non-selected product, and the other one of said in-feed conveyor stations positioned at the terminal end of said second conveyor for receiving said selected product;

and wherein at least one of said in-feed conveyor stations comprises: a top conveyor having a top conveyor belt with a convex down transverse profile; and a bottom conveyor having a bottom conveyor belt with a concave up transverse profile; said top conveyor belt and said bottom conveyor belt arranged to bend either said selected product or said non-selected product between said top belt and said lower belt.

19. A method for reducing the delivery rate of a stream of products utilizing a system for diverting selected products in a stream of products moving in a first path from non-selected products, said system comprising:

a) a first continuous conveyor;
b) a second continuous conveyor having a product delivery position that is vertically displaced from said first conveyor;
c) a rotary diverter for acquiring said selected products from said first conveyor at substantially the same horizontal velocity as said first conveyor, and for moving said selected products continuously and generally longitudinally and for delivering said selected product onto said second conveyor at substantially the same horizontal velocity as said second conveyor;

said method comprising the step of selectively diverting product delivered generally longitudinally from said first conveyor to a second path by moving said selected products continuously and generally longitudinally to a second path from said stream of products to said product delivery position that is vertically displaced from said first conveyor.

20. A method as claimed in claim 19 wherein said selected products are obtained in succession from said first conveyor at a pickup position.

21. A method as claimed in claim 20 wherein said selected products are delivered in succession to said delivery position on said second conveyor.

22. A method as claimed in claim 19 wherein said selected products are selectively diverted from said first conveyor to said second conveyor by said rotary diverter having a lifting effector.

23. A method as claimed in claim 19 wherein the horizontal velocity of said lifting effector at said pickup position substantially equals horizontal velocity of said first conveyor when said selected product is obtained from said first conveyor at said pickup position.

24. A method as claimed in claim 23 wherein horizontal velocity of said lifting effector at said delivery position substantially equals horizontal velocity of said second conveyor when said selected product is delivered to said second conveyor at said delivery position.

25. A method as claimed in claim 19 wherein horizontal velocity of said lifting effector at said pickup position substantially, equals horizontal velocity of said first conveyor when said selected product is obtained from said first conveyor at said pickup position, and wherein horizontal velocity of said lifting effector at said delivery position substantially equals horizontal velocity of said second conveyor when said selected product is delivered to said second conveyor at said delivery position.

26. A method as claimed in claim 25 wherein the lifting effector has a component of upwards velocity at said pick-up position.

27. A method as claimed in claim 26 wherein the lifting effector has a component of downwards velocity at said delivery position.

28. A method as claimed in claim 27 wherein horizontal velocity of said second conveyor is less than horizontal velocity of said first conveyor upstream from said rotary diverter.

29. A method as claimed in claim 27 wherein horizontal velocity of said first conveyor downstream from said rotary diverter is less than horizontal velocity of said first conveyor upstream from said first conveyor.

* * * * *